Figure 1:
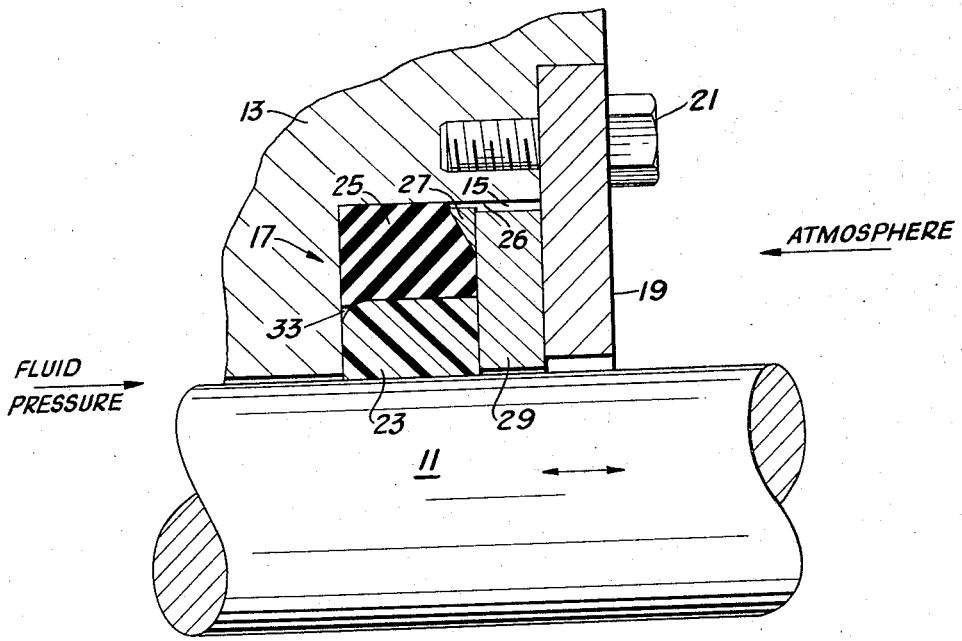

INVENTOR.
PAUL R. SHEPLER 3,300,225
EXTRUSION PROTECTED RESILIENT ROD SEAL
Paul R. Shepler, Towson, Md., assignor to Koppers
Company, Inc., a corporation of Delaware
Filed Oct. 20, 1964, Ser. No. 405,124
1 Claim. (Cl. 277—165)

This invention relates generally to fluid sealing devices.

Where a difference in pressure exists and a reciprocating or rotating rod, as in the case of a pump or actuator, extends through the different pressure zones, a seal must be provided for the rod to prevent the escape of fluid contained under pressure within the housing. Usually a cavity is made in the housing and a seal assembly placed around the rod in the cavity. In general, the sealing efficiency of the assembly is governed by two factors; the sealing material and the pressure exerted by the sealing material against the rod. Leakage of the fluid between the seal and the rod is minimized by radially squeezing the sealing material against the rod. Increasing the pressure of the sealing material against the rod, of course, increases the friction of the rod. Thus, the sealing material that is selected must be a sealing material which has both a low coefficient of friction so that the machine is not unduly loaded by the friction caused by squeezing the seal and which has good resistance to any wear that may be engendered by the friction.

It has been found that tetrafluoroethylene, for example, sold under the trademark Teflon, possesses superior wear properties along with a low coefficient of friction. It has also been found that these desirable characteristics of tetrafluoroethylene may be enhanced by mixing various additives with it.

Nevertheless, problems have been encountered in squeezing tetrafluoroethylene against a shaft. The extent to which tetrafluoroethylene can be compressed by ordinary means is limited. One method of compressing the tetrafluoroethylene against a shaft has been to force into the cavity between the shaft and the housing surrounding the shaft, a mass of tetrafluoroethylene that, without compression, normally occupies a volume greater than the cavity. However, as the rubbing of the surface of the shaft wears away the surface of the seal as the shaft is placed in use, the compression is released and leakage occurs. In addition, the tetrafluoroethylene can be compressed only very little; so the seal will not float radially, and this is usually necessary due to eccentricity of the rod. These disadvantages can be overcome to some extent by making the seal in segments and placing a garter spring around the outer periphery of the segments to maintain compression or pressure of the tetrafluoroethylene against the shaft. Segmental seals, of course, inherently offer less sealing capability, so two or more seals are usually placed in axially abutting relationship in an effort to remedy this deficiency.

In addition to preventing the escape of fluid between the shaft and the sealing material, it is necessary to prevent the escape of fluid between the sealing material and the housing. Again, the greater the pressure between the seal and the housing, the less the likelihood exists that leakage will occur. If the configuration of the seal does not admit of compression against the housing, then auxiliary means are necessary to affect static sealing.

In accordance with this invention, the sealing is accomplished by surrounding the shaft with a ring of tetrafluoroethylene, encircling this ring with another annular ring of synthetic material that is softer than the tetrafluoroethylene, and compressing the latter ring to thus squeeze the tetrafluoroethylene ring against the rod. Additionally, the softer ring is also compressed axially so that the radially extending faces and the outer periphery of the ring bear against the cavity walls to provide further sealing.

The above and further objects and novel features of the invention will appear more fully from the following detailed description when the same is read in connection with the accompanying drawings. It is to be expressly understood, however, that the drawings are not intended as a definition of the invention but are for the purpose of illustration only.

Figure 2:
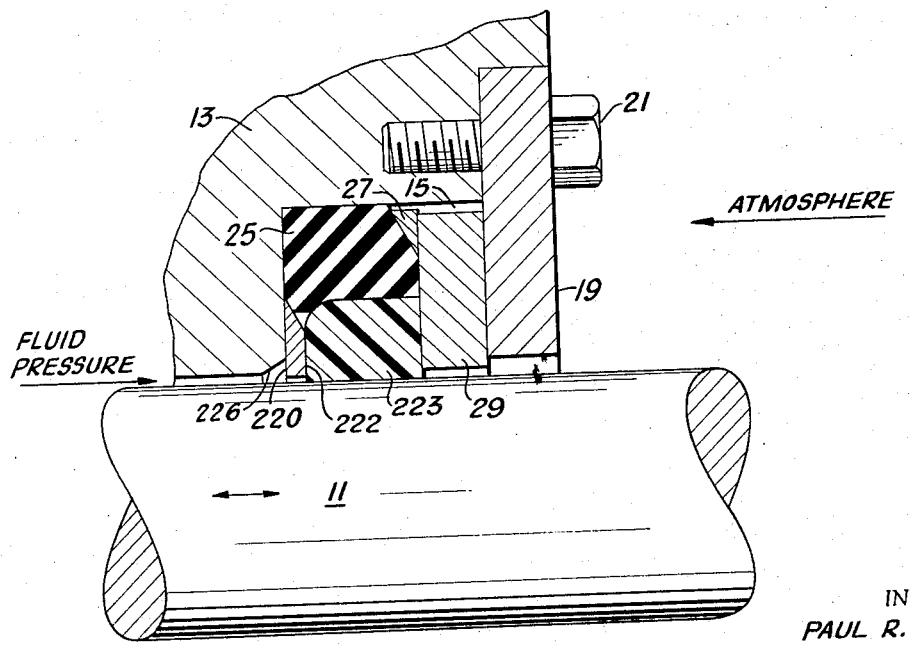
Figure 3:
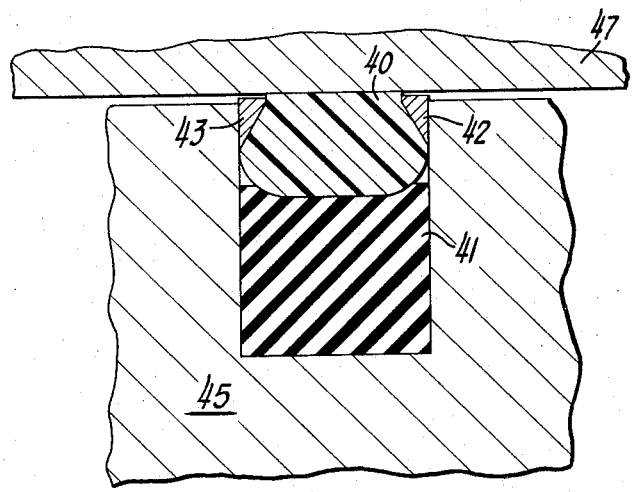
Figure 4:
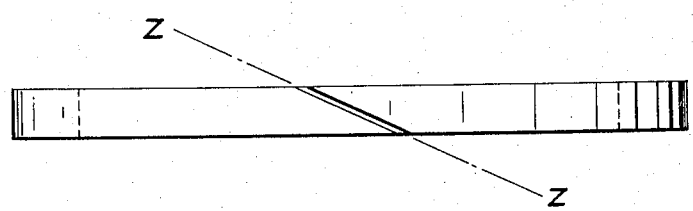

In the drawings wherein like parts are marked alike:

FIGURE 1 is a fragmentary sectional view in side elevation illustrating an embodiment of the novel seal assembly as being mounted in a reciprocating piston pump or actuator, FIGURE 2 is a fragmentary sectional view in side elevation illustrating another embodiment of the invention, FIGURE 3 is a fragmentary sectional view in side elevation illustrating a still further embodiment of the invention, and FIGURE 4 is a plan view of one of the rings used in FIG. 3.

The drawings illustrate a conventional reciprocating rod 11 for a piston (not shown). The rod is surrounded by a housing 13 which includes a cavity 15 for a seal assembly 17 and a retainer 19 suitably secured to the housing such as by bolts 21 for maintaining the seal assembly in the cavity.

In accordance with this invention, the seal assembly comprises an inner ring 23, an outer ring 25, a ring 27 and a back-up ring 29.

The inner ring 23 is made from a resilient sealing material. Preferably it is a material comprising tetrafluoroethylene (Teflon 7 base), 70% by volume and amorphorous carbon (Karbonaro), 30% by volume. Advantageously, the Karbonaro is disintegrated to particles of about 100 micron in size for this composition. Such composition may be molded at room temperature under pressure of 10,000 p.s.i. for a period of 2 seconds to 5 minutes and the structure removed from the mold and sintered for about 3 hours at approximately 720° F. The ring is then cooled rapidly in air. This formulation should have a percent volume to percent weight ratio of .90 to .92. (The percent volume being measured in a 100× photomicrograph and the percent weight being obtained by dissolving the Karbonaro with a mixture of perchloric and nitric acid in the known manner.) The formulation as just described will have a D scale Shore durometer of about 74.

The inner ring 23 is substantially rectangular in cross-section. The inner diameter of ring 23 is approximately the same as the outer diameter of the rod 11. Thus, ring 23 is easily mounted upon the rod 11 and inserted into the cavity 15.

The outer ring 25 compresses inner ring 23 and thus causes ring 23 to exert pressure on shaft 11. The outer ring 25 is made from a resilient material such as synthetic rubber, the preferred type being Buna N because of its resistivity to oils, acids and the like. The outer ring should have a hardness lower than that of the inner ring 23, for example, an A scale Shore durometer hardness of about 74.

Outer ring 25 is also substantially rectangular in cross-section with an outer diameter approximately the same as the diameter of the cavity 15 so that the outer ring is easily inserted in the cavity. The inner diameter of the ring 25 is slightly smaller than the outer diameter of the inner ring 23, for example, about .010 inch smaller, so that outer ring 25 must be expanded to surround the inner ring 23.

An additional force is exerted on ring 25 and indirectly upon ring 23 by compressing ring 25 with a ring 27. This compressing ring 27 is made of a hard material, preferably steel, and is substantially triangular in cross-section. The outside diameter of the ring 27 is slightly smaller than the diameter of the cavity 15 so that it may be easily inserted in the cavity. Another function of ring 27 is to prevent the rubber of ring 25 from extruding along wall 26 due to the pressure exerted by the pressure fluid.

In the embodiment illustrated a back-up ring 29 is provided. Ring 29 is made of a hard material, preferably cast iron so that galling does not occur between the back-up ring and the rod which is usually chrome-plated. The axial length of the back-up ring 23 should be great enough to withstand the compression forces (to be later described) without substantial axial distortion since such distortion would cause the outer rings to be pressed unevenly against the wall of cavity 15 and leakage could occur in the area of less pressure. The outer diameter of the ring 29 is somewhat smaller than the diameter of the cavity and inner is about the same as the diameter of the rod so that the ring is easily placed on the rod. Ring 29 also prevents the extrusion of the tetrafluoroethylene along shaft 11 due to the force of the pressure fluid.

Compression of the inner ring 23 so that it applies a pressure around rod 11 to create a seal is accomplished by making the sum of the axial lengths of the outer ring 25 and back-up ring 29 together exceed the axial length of cavity 15. Thus, when all of the rings are loosely inserted in the cavity, the back-up ring 29 will protrude beyond the cavity. When the bolts 21 are tightened, the retaining ring 19 will act against the back-up ring 35 thereby compressing the outer ring 25 into the cavity. The pressure bearing upon the outer ring is, of course, transmitted in all directions. Thus, the outer ring exerts a force against the walls of the cavity, creating a static seal. In addition, the outer ring exerts a force against the periphery of the inner ring tending to squeeze it tightly around the rod creating a dynamic seal. The axial length of the outer ring may be varied to create the pressure required by the particular application.

The axial length of the inner ring 23 is such that it is not usually compressed axially. Advantageously one outer corner 33 of the inner ring 23 is removed to provide a space into which the outer ring can flow when it is compressed. The rounded corner 33 permits easier assembly of the outer ring 25 on the inner ring.

To assemble the seal, the outer ring 25 is placed around rod 11 and pushed into the cavity 15. The ring 27 is then placed adjacent the outer ring facing with the slanting edge facing as in FIG. 1. The inner ring 23 is placed around the rod. It is helpful to put a lubricant on the rounded corner 33 of the inner ring 23 and then push inner ring 23 along rod 11 until ring 23 rests against outer ring 25. Next, the back-up ring 29 is placed against the inner ring 23. Finally, the retainer 19 is placed against the assembly and the bolts 21 threaded into the housing 13. As bolts 21 are tightened against housing 13, the inner ring 23 is pushed into the outer ring 25 and subsequently the outer ring 25 is compressed in the cavity 15 thus forcing the inner ring 23 against the rod 11. Thus, both dynamic and static sealing are accomplished.

As an illustration of the utility of this invention, laboratory tests have been made under the following conditions with results as indicated. The seal was made to fit a 2½ inch diameter rod reciprocating at 15–20 cycles per minute at a temperature of 170°–190° F. The pressure of the fluid being sealed was 0–3000 pounds per square inch pulsating pressure. The overlength of the outer ring was .015–.025 inch resulting in a friction load of about 1000 lbs. on the rod. Less than 0.3 cubic centimeter per hour leakage occurred for a period of 846,000 cycles of the rod. Failure occurred after 846,000 cycles, failure being defined as a leakage greater than 0.3 cubic centimeter per hour.

The embodiment of the seal assembly shown in FIG. 2 utilizes another ring 220 in addition to ring 27. Accordingly, inner ring 223 is shortened axially to accommodate ring 220. The ring 220 is in relation to ring 25 as the ring 27 is to ring 25 but that one surface 222 is made to coact somewhat with the inner ring 223. The ring 220 is desirable in replacement applications where the housing 13 has an entry bevel 226.

In assemblies utilizing the embodiment of FIG. 2, ring 220 is first placed around the rod 11 and into the cavity 15. The remaining parts are assembled as set forth above in the description of FIG. 1.

The embodiment illustrated in FIG. 3 is particularly desirable for use in a piston head where step joint split rings are used. As is well known, the conventional step joint split rings are subject to considerable leakage through the joint. The seal of FIG. 3, having no joint, is not subject to joint leakage. When the seal is operating where pressures exceeding 3000 p.s.i. are common, a tendency exists for the tetraflouroethylene to extrude between the piston and the cylinder, but rings 42 and 43 prevent such extrusion.

In accordance with this invention, ring 40 is made of tetraflouroethylene and is a continuous annulus with an outer diameter substantially the same as the bore of the cylinder and with an inner diameter considerably smaller than the outer diameter of the rubber ring 21. The radially extending sides of the ring 40 are tapered to accommodate the anti-extrusion rings 42, 43, as shown in FIG. 3. The corners of the ring 40 in juxtaposition to the rubber ring 41 are rounded to provide a space into which the rubber ring 41 can flow when it is deformed at assembly of the seal in the groove. The rubber ring 41 is a continuous annulus substantially rectangular in cross-section. The outer diameter of ring 41 is considerably larger than the inner diameter of the ring 40 and the inner diameter of ring 41 is substantially the same size as the bottom of the groove in the piston 45. Each anti-extrusion ring 42, 43 is made of a hard material such as cast iron. It is a non-continuous annulus substantially triangular in cross-section as shown in FIG. 3. The continuity of each ring is broken along a plane Z—Z extending at an angle to the axial center of the ring as shown in FIG. 4 so that the rings are in reality split rings. This permits the ring to be spread open sufficiently for installation in the groove. The outer diameter of the ring fits closely inside the cylinder bore so that the ring 40 does not extrude between the piston and the bore.

In operation the rubber ring 41 is stretched so that it will slip over the piston 45 and into the groove. The ring 40 is stretched and slipped over the piston and into the groove and finally the anti-extrusion rings 42 and 43 are spread apart and slipped over the piston and into the groove. In this condition, because of the difference in overlapping diameters of the rings 40 and 41, ring 40 will be expanded by the ring 41 so that its O.D. will be larger than the bore of the cylinder. The ring 40 is then compressed so that it will slide into the cylinder. In this latter operating position, the ring 40 is pressed into even contact with the bore of the cylinder. The O.D. of the rubber ring may be varied to provide the desired pressure between the ring 40 and the bore of the cylinder 47. Under pressures of from 3000–5000 p.s.i., the ring 40 is prevented from extruding between the piston and the bore.

If the seal is used with a split piston, the anti-extrusion rings 42, 43 can be made as a continuous annulus, there being no need for splitting the ring in order to assemble it in the groove. Under high pressure conditions, it may be desirable to provide another anti-extrusion ring to prevent extrusion of the rubber ring between the parts of the piston. It is not necessary to remove a corner of the rubber ring to accommodate the anti-extrusion ring.

The rubber can be deformed sufficiently to accommodate the ring.

To assemble the seal in the split piston it is necessary only to place the rings in the proper position then assemble the piston cap to the piston and finally compress the ring 40 so that the piston and ring assembly can be inserted in the cylinder.

It will be apparent with the previously described operation of the seal that it is possible to effectively seal a rotating or reciprocating rod with a resilient sealing element having a simple and economical means for maintaining compression of the sealing element against the rod.

Although several embodiments have been illustrated and described above, it should be understood that, within the scope of the appended claim, variation may be readily made by one skilled in the art. For instance, seals may be placed in tandem on a shaft or a pair of seals may be placed in back-to-back relation to seal different fluids from one another.

I claim:

A seal assembly for the cavity surrounding a shaft comprising:
- a rubber ring of generally rectangular cross-section and having an outer diameter smaller than said cavity and an inner diameter larger than said shaft,
- a band of tetraflouroethylene having an inner diameter of a size to fit said shaft and an outer diameter slightly larger than the inner diameter of said rubber ring, said band disposed between said shaft and said rubber ring,
- a metallic ring of generally triangular cross-section engaging said rubber ring at an outer corner thereof to decrease extrusion flow of the latter,
- a retainer ring engaging said rubber ring, said metallic ring and said band forcing the ring and band into said cavity whereby the rubber ring is deformed to bear against the cavity and the band, and the band is forced against the shaft thereby effectively sealing the shaft.

References Cited by the Examiner

UNITED STATES PATENTS

| | | | |
|---|---|---|---|
| 2,877,070 | 3/1959 | Lee | 277—165 |
| 2,973,978 | 3/1961 | Oppenheim | 277—188 |
| 3,144,254 | 8/1964 | Krizman | 277—112 X |
| 3,218,087 | 11/1965 | Hallesy | 277—112 |
| 3,261,613 | 7/1966 | Norick et al. | 277—188 |

FOREIGN PATENTS 249,662   2/1964   Australia.

SAMUEL ROTHBERG, *Primary Examiner.*